W. E. THREM.
COMBINED FISH HOOK AND SINKER.
APPLICATION FILED MAR. 16, 1914.
1,103,707.
Patented July 14, 1914.
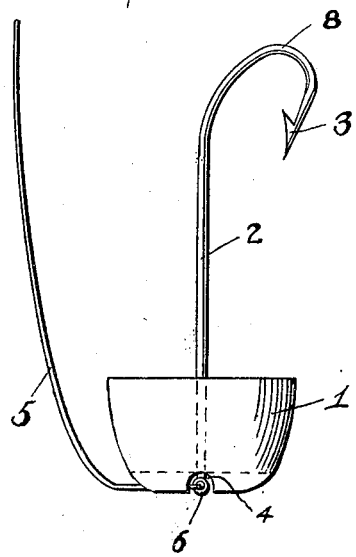
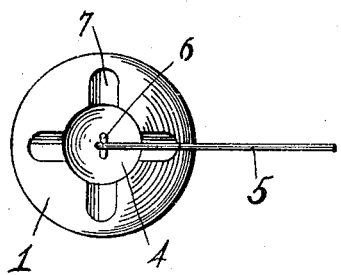
Witnesses
R. F. Veihmeyer.
Wm. S. Fowler.
Inventor
William E. Threm.
By ........ Randolph Jr.
Attorney

UNITED STATES PATENT OFFICE.

WILLIAM E. THREM, OF CINCINNATI, OHIO.

COMBINED FISH-HOOK AND SINKER.

1,103,707.  Specification of Letters Patent.  Patented July 14, 1914.

Application filed March 16, 1914. Serial No. 825,079.

*To all whom it may concern:*

Be it known that I, WILLIAM E. THREM, a citizen of the United States, residing at Cincinnati, in the county of Hamilton and State of Ohio, have invented certain new and useful Improvements in Combined Fish-Hooks and Sinkers; and I do hereby declare the following to be a full, clear, and exact description of the invention, such as will enable others skilled in the art to which it appertains to make and use the same.

This invention comprehends certain new and useful improvements in combined fish hooks and sinkers and has for its primary object to provide a device of this character which will be of extremely simple construction, and operation and highly efficient in use.

Another object is to provide a device of this character which will be formed of a minimum number of parts and which will be constructed in such manner that the cord or line may be readily threaded in the eye at one end of the fish hook secured in the sinker, while the opposite end of said fish hook is curved and pointed for engagement with the jaws of the victim.

A still further object is to provide a device of this character which will be formed in such manner that all danger of the hook catching upon the anchor will be eliminated.

This invention has for a still further object to generally improve and simplify the construction and operation of devices of this character and increase the efficiency thereof without increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is an elevational view of the complete device, and Fig. 2 is a top plan view thereof.

Referring in detail to the drawings by numerals, 1 designates the sinker, which is preferably solid and may be formed of any suitable material and through which the inner end of the stem 2 of the hook 3 is secured, the inner end of the anchor 1 being provided with the recess 4, whereby the fishing line 5 may be readily threaded through the eye 6 formed on the inner end of said shank 2.

The sides of the anchor 1 are preferably convex, thereby providing the sinker with a small inner or rear end, within which are positioned radially directed recesses 7 connecting at their inner ends with the recess 4, whereby the fishing line 5 may rest in one of said radially directed recesses 7 and thereby permit the anchor 1 to rest in inverted position upon the bed of a stream, the shank 2 of the hook 3 extending upwardly from said sinker 1, as clearly shown in Fig. 1. It will also be understood that the eye 6 is flush with the outer end of the anchor 1. I also prefer to curve the upper free end of the shank 2, as shown at 8, before forming the hook proper 3 upon the extremity thereof.

From the foregoing it will be clearly apparent that I have provided a combined fish hook and sinker of extremely simple construction and which will be highly efficient in use as well as cheap to manufacture.

While I have shown and described the preferred embodiment of my invention, it will be understood that minor changes in construction, combination and arrangement of parts may be made without departing from the spirit and scope of the invention as claimed.

Having thus described my invention, I claim:—

1. A device of the character described comprising a sinker, a shank extending through said sinker and having an eye formed on one end, said sinker being provided with a recess to accommodate the eye and radially directed recesses extending from the first mentioned recess to accommodate a line threaded in said eye, and a hook formed on the opposite end of said shank.

2. A device of the class described comprising a sinker, a shank having one end secured in said sinker, an eye formed on said end of the shank, the opposite end of said shank being curved, a hook formed on the free extremity of said shank, said sinker having an eye accommodating recess in one end, said eye being positioned in said recess and flush with said end of the sinker, line accommodating recesses projecting radially from the eye accommodating recess, and a line positioned in one of said radially directed recesses and having its end threaded in the eye.

In testimony whereof I affix my signature in presence of two witnesses.

WILLIAM E. THREM.

Witnesses:
JOHN C. SCHER,
JOHN F. RENK.

Copies of this patent may be obtained for five cents each, by addressing the "Commissioner of Patents, Washington, D. C."